(12) United States Patent
Vestergaard et al.

(10) Patent No.: US 7,466,823 B2
(45) Date of Patent: Dec. 16, 2008

(54) DIGITAL MEDIA DISTRIBUTION METHOD AND SYSTEM

(76) Inventors: Steve Vestergaard, 6330 Chatham Street, West Vancouver, British Columbia (CA) V7W 2E2; Che-Wai (William) Tsui, 1398 El Camino Drive, Coquitlam, British Columbia (CA) V3E 2W6; Edward Kolic, 812 Baycrest Drive, North Vancouver, British Columbia (CA) V7G 1N8

( * ) Notice: Subject to any disclaimer, the term of this patent is extended or adjusted under 35 U.S.C. 154(b) by 546 days.

(21) Appl. No.: 09/980,582

(22) PCT Filed: Mar. 5, 2001

(86) PCT No.: PCT/CA01/00250

§ 371 (c)(1),
(2), (4) Date: Apr. 4, 2002

(87) PCT Pub. No.: WO01/65796

PCT Pub. Date: Sep. 7, 2001

(65) Prior Publication Data

US 2002/0146122 A1 Oct. 10, 2002

(30) Foreign Application Priority Data

Mar. 3, 2000 (CA) .................................... 2299946

(51) Int. Cl.
*H04N 7/167* (2006.01)
(52) U.S. Cl. .................. 380/227; 380/202; 380/231; 380/277; 380/282; 713/165; 713/167; 713/176; 713/189; 713/193
(58) Field of Classification Search ................. 713/193, 713/190, 194, 165, 167, 189, 176; 709/206; 705/51–52, 59, 55; 380/21, 277–285, 227, 380/202, 231
See application file for complete search history.

(56) References Cited

U.S. PATENT DOCUMENTS 4,805,222 A 2/1989 Young et al.

(Continued)

FOREIGN PATENT DOCUMENTS

CA 2201200 9/1998

(Continued)

OTHER PUBLICATIONS

John R. Luni et al., "Streaming Audio: The FezGuys' Guide", New Riders Publishing, May 2002, Chapters 1, 3-7, 8-9.

(Continued)

*Primary Examiner*—KimYen Vu
*Assistant Examiner*—Baotran N To
(74) *Attorney, Agent, or Firm*—Oyen Wiggs Green & Mutala LLP

(57) ABSTRACT

A method and system for secure distribution of digital media files including text, video, audio and combinations of these is described. A particular embodiment involves the distribution of audio tiles (particularly music) which are presently being widely distributed over the internet without compensating the various rights holders. In some embodiments, audio content (except for an optional preview section) is encrypted in a single executable file, allowing it to be freely distributed. When consumers want to access the encrypted portion of the file, a decryption key is obtained from a remote server, but because the file includes an integral decryption engine, a decrypted copy of the file never appears on the client side. Thus, there is no unprotected copy that the consumer can illegally distribute. The disclosure also describes other advantageous techniques, such as bonding the decryption key to the consumer's computer, so it cannot be used by others.

34 Claims, 12 Drawing Sheets

U.S. PATENT DOCUMENTS

| | | | |
|---|---|---|---|
| 5,636,276 A * | 6/1997 | Brugger | 705/54 |
| 5,765,152 A | 6/1998 | Erickson | |
| 5,765,153 A | 6/1998 | Benantar et al. | |
| 5,790,790 A | 8/1998 | Smith et al. | |
| 5,802,518 A | 9/1998 | Karaev et al. | |
| 5,819,271 A | 10/1998 | Mahoney et al. | |
| 5,845,067 A | 12/1998 | Porter et al. | |
| 5,864,871 A | 1/1999 | Kitain et al. | |
| 5,892,909 A | 4/1999 | Grasso et al. | |
| 5,959,945 A | 9/1999 | Kleiman | |
| 5,991,399 A * | 11/1999 | Graunke et al. | 380/279 |
| 6,006,332 A | 12/1999 | Rabne et al. | |
| 6,014,689 A * | 1/2000 | Budge et al. | 709/206 |
| 6,052,780 A * | 4/2000 | Glover | 713/193 |
| 6,055,314 A * | 4/2000 | Spies et al. | 380/228 |
| 6,073,124 A | 6/2000 | Krishnan et al. | |
| 6,121,963 A | 9/2000 | Ange | |
| 6,122,737 A | 9/2000 | Bjorn et al. | |
| 6,185,684 B1 | 2/2001 | Pravetz et al. | |
| 6,226,618 B1 | 5/2001 | Downs et al. | |
| 6,236,971 B1 | 5/2001 | Stefik et al. | |
| 6,311,270 B1 * | 10/2001 | Challener et al. | 713/169 |
| 6,332,146 B1 | 12/2001 | Jebens et al. | |
| 6,334,130 B1 | 12/2001 | Tada et al. | |
| 6,366,914 B1 | 4/2002 | Stern | |
| 6,385,596 B1 * | 5/2002 | Wiser et al. | 705/51 |
| 6,389,538 B1 * | 5/2002 | Gruse et al. | 713/194 |
| 6,434,535 B1 * | 8/2002 | Kupka et al. | 705/24 |
| 6,553,404 B2 | 4/2003 | Stern | |
| 6,564,248 B1 * | 5/2003 | Budge et al. | 709/206 |
| 6,675,297 B1 * | 1/2004 | Ignaszewski | 713/190 |
| 6,697,944 B1 * | 2/2004 | Jones et al. | 713/168 |
| 6,717,957 B1 | 4/2004 | Quine | |
| 6,782,415 B1 | 8/2004 | Quine | |
| 6,813,711 B1 * | 11/2004 | Dimenstein | 713/182 |
| 6,865,555 B2 * | 3/2005 | Novak | 705/59 |
| 6,892,306 B1 * | 5/2005 | En-Seung et al. | 713/193 |
| 7,003,670 B2 | 2/2006 | Heaven et al. | |
| 7,103,574 B1 * | 9/2006 | Peinado et al. | 705/51 |
| 7,305,702 B2 | 12/2007 | Bell et al. | |
| 2001/0011238 A1 * | 8/2001 | Eberhard et al. | 705/27 |
| 2002/0016718 A1 | 2/2002 | Rothschild et al. | |
| 2002/0052887 A1 | 5/2002 | Mori | |
| 2002/0083006 A1 | 6/2002 | Headings et al. | |
| 2002/0169667 A1 | 11/2002 | Marotta et al. | |

FOREIGN PATENT DOCUMENTS

| | | |
|---|---|---|
| CA | 2242130 | 9/2001 |
| CA | 2299946 | 9/2001 |
| CA | 2345170 | 10/2001 |
| JP | 2000-330881 | 5/1999 |
| JP | 2002-169973 | 12/2000 |
| WO | 97/09801 | 3/1997 |
| WO | WO 98/11690 | 3/1998 |
| WO | 00/79826 | 6/2000 |
| WO | 01/54324 | 1/2001 |
| WO | 01/82023 | 4/2001 |
| WO | 01/33829 | 5/2001 |
| WO | 01/98903 | 6/2001 |
| WO | 02/45316 | 6/2002 |
| WO | 02/48903 | 6/2002 |

OTHER PUBLICATIONS

Seth McEvoy, "Windows Media Player 7 Handbook", Microsoft Press, 2000, Chapters 2, 3 and 4.
Bradley Ford et al., "Revolutionary QuickTime Pro", Friends of Ed, Mar. 2002, Chapter 6.
Tim Berners-Lee, "Information Management; a Proposal", CERN, Mar. 1989, http://www.w3.org/History/1989/proposal.rtf.
Apache HTTP Server Version 1.3, "Authentication, Authorization, and Access Control", Dec. 5, 2001, http://httpd.apache.org/docs/howto/auth.html.
Anonymous, "Maximum Linux Security", Sams Publishing, Sep. 1999, Part IV: Linux Internet Security, Chapter 14: Web Server Security.
CNET News.com article "The latest in anti-piracy efforts: keystroke recognition" by John Borland, Jun. 2000, http://news.com/2100-1023-241792.html.
New York Times article "New Encryption Strategy: Typing Rhythm" by Michael Marriott, Jun. 2000, http://nytimes.com/library/tech/00/06/circuits/articles/29type.html.
Wired article "Songs in the Key of You" by Frank Jossi, Oct. 2000, http://wired.com/wired/archive/8.10/mustread.html?pg=10.
Ernesto Damiani et al., "Controlling Access to XML Documents", IEEE Internet Computing, Nov.-Dec. 2001.
Elisa Bertino et al., "Supporting Multiple Access Control Policies in Database Systems", 1996, Proceedings of the 1996 IEEE Symposium on Security and Privacy.
Warwick Ford et al., "A Key Distribution Method for Object-Based Protection", Proceedings of the 2nd Association of Computing Machinery Conference on Computer and Communications Security, 1994, pp. 193-197.
Kelly Jackson Higgens, "S/Mime and Open PGP Vie for Security Title", Network Computing, Mar. 1998, www.networkcomputing.com/904/904btb.html.
Elisa Bertino et al., "Securing XML Documents with Author-X", IEEE Internet Computing, May-Jun. 2001, pp. 21-31.
Robert Knight, "Document Management on LANs is in Demand", Software Magazine, Feb. 1991.
North Plains Systems Inc., TeleScope Design Documentation (three documents: "Database Design", "I-Piece Design and API", and "Editorial Info File Format"), Jul. 1996, http://web.archive.org/web/19980714063904/northplains.com/developer.html.
Web pages published by North Plains Systems Inc., "Frequently Asked Questions", Jan. 1998, http://web.archive.org/web/19981203011640/northplains.com/faq.html.
Web pages published by Musicrypt Inc., Jun. 2001, http://web.archive.org/web/20010608010344rn_2/www.musicrypt.com/html and linked pages.
"Protected W3C httpd Setup", World Wide Web Consortium (W3C), Jul. 1995, http://www.w3.org/Daemon/User/Config/AccessAuth.html.
Ari Luotonen, "Protected CERN Server Setup", CERN, 1994, http://www.etsimo.uniovi.es/~antonio/cern_httpd/Config/AccessAuth.html.
Robert Williamson, File Forwarding in FidoNet Technology Networks, Oct. 31, 1995, http://www.ftsc.org/docs/fsc-0087.001.
FidoNet Policy Document, Jun. 9, 1989, http://www.fidonet.org/old/policy4.txt.
Fidgit Greylock, "A Standard for "Bark" File Requests", Greylock Software, Inc., Dec. 18, 1987, http://www.ftsc.org/docs/fsc-0013.001.
Barry Geller et al., "A Collection of Notes on Moving Files in FidoNet", Greylock Software, Inc., 1988, http://www.ftsc.org/docs/fsc-0028.001.
John Mudge, "Encrypted Message Identification for FidoNet", Feb. 25, 1993, http://www.ftsc.org/docs/fsc-0073.001.
"Open Financial Exchange Specification 1.0.2", May 30, 1997, CheckFree Corp., Intuit Inc., Microsoft Corp.
Web pages published by Pressplay, May 2000-Nov. 2002: http://web.archive.org/web/20021120213006/www.pressplay.com/faq.html, http://web.archive.org/web/20011130023215/http://pressplay.com/, http://web.archive.org/web/20011207132135/pressplay.com/pressrelease20000502.html.
Web pages published by MusicNet, Dec. 2001-Feb. 2002, http://web.archive.org/web/20020125000045/http://www.musicnet.com/, http://web.archive.org/web/20020204101756/www.musicnet.com/press.html, http://web.archive.org/web/20020204095613/www.musicnet.com/faq.html.
Web pages published by Digital Courier, Jul. 1996-Jun. 1998, http://web.archive.org/web/*/www.digitalcourier.com.

Web pages published by DG Systems, Jan. 1997-Feb. 2002, http://web.archive.org/web/*/http://www.dgsystems.com.

Web pages published by FirstSpin, Apr. 2001-Aug. 2002, http://web.archive.org/web/*/http://www.firstspin.com.

Web pages published by eMeta, Apr.-May 2002, http://web.archive.org/web/*/http://www.emeta.com.

Web pages published by Liquid Audio, Feb. 1998-Jun. 2002, http://web.archive.org/web/*/http://www.liquidaudio.com.

Statement of Gerald W. Kearby, President and CEO of Liquid Audio, Inc., Before the United States Senate Committee on the Judiciary, "Online Entertainment and Copyright Law: Comming Soon to a Digital Device Near You.", Apr. 3, 2001, http://judiciary.senate.gov/oldsite/te040301gwk.htm.

Brochure for "DOCS Open, Enterprise Document Management System", PC DOCS Inc,. 1999.

Web pages published by SpotTaxi, May 2000-Feb. 2001, http://web.archive.org/web/*/http://www.spotaxi.com.

"CERN httpd", World Wide Web Consortium (W3C), 1999, http://www.w3.org/Daemon/.

Xerox Corporation, "DocuShare 2.2 Users Guide", 1997-2000.

Web pages published by iDrive.com, Jun. 2001, http://web.archive.org/web/*/http://www.idrive.com.

Web pages published by Multex.com, Mar./Apr. 2000, http://web.archive.org/web/*/http://www.multex.com.

Web pages published by Driveway Corporation, Aug. 2000, http://web.archive.org/web/*/http://www.driveway.com.

Ralf S. Engelschall, "Apache Desktop Reference", Oct. 2000.

* cited by examiner

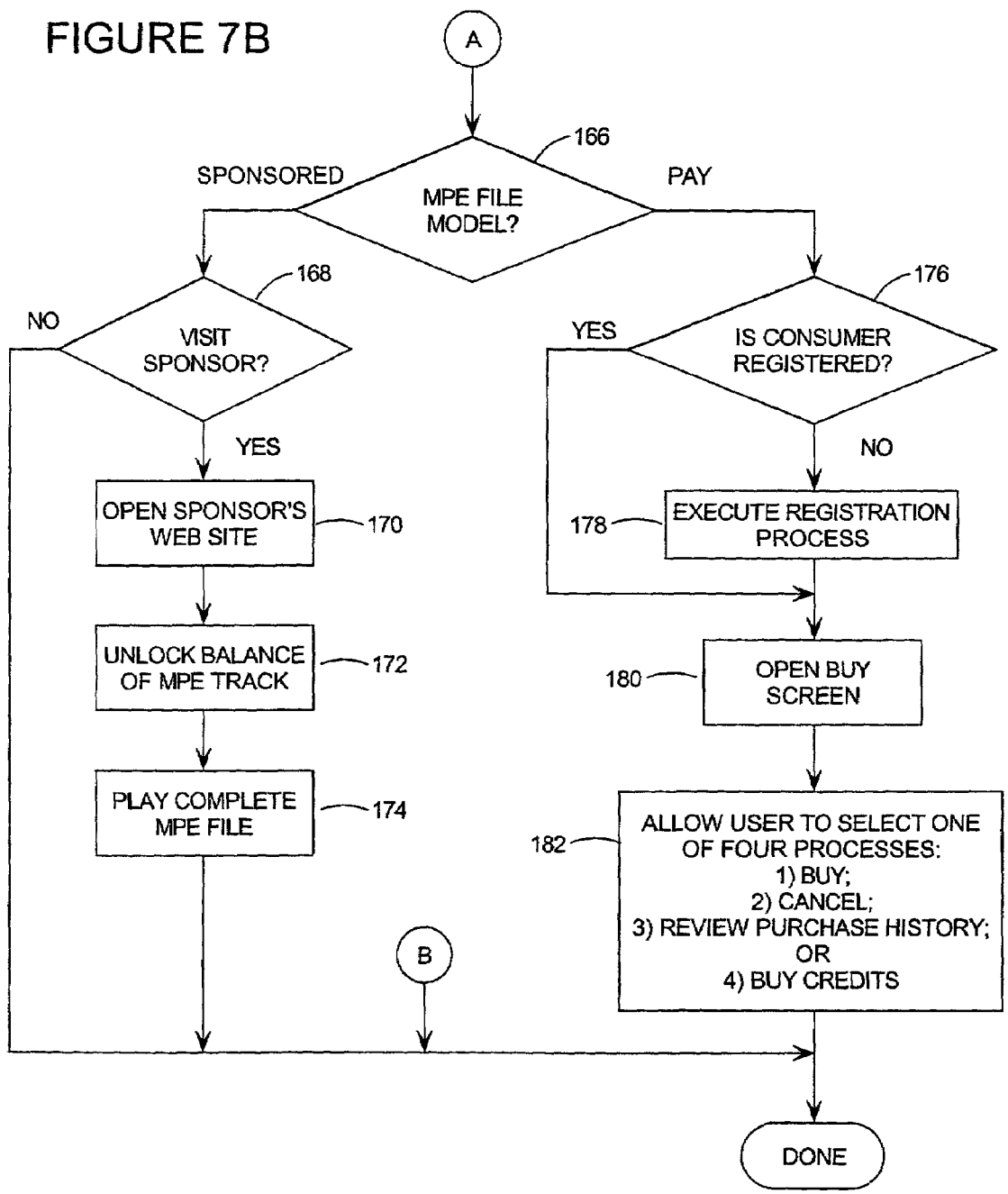

DIGITAL MEDIA DISTRIBUTION METHOD AND SYSTEM

The present invention relates generally to computers and computer software and more specifically, to a method and system for secure distribution of digital media files over computer networks.

BACKGROUND OF THE INVENTION

It is well known that data communication networks such as the Internet, Wide Area Networks (WANs) and Local Area Networks (LANs), offer tremendously efficient means of organizing and distributing computerized data. These efficiencies have resulted in their widespread use for both business and personal applications. The Internet for example, is now a common medium for operating online auctions, academic and public forums, distributing publications such as newspapers and magazines, and performing electronic commerce and electronic mail transactions. It is also a common medium for distributing electronic content including audio, video, still images, text and multi-media (i.e. combinations of these forms).

In fact, the widespread use of distributed computing and file-sharing networks, such as the Internet, has enabled consumers to become distributors of digital content, allowing anyone to copy and redistribute free and/or illegal copies of songs, photographs, videos and other digital content.

Creators of media content have a property right to the content they create, usually enforceable via copyright or trademark laws. The concern is the copying and distribution of this content without compensating the rights holders. The mechanism to protect and track digital content is referred to as Digital Rights Management technology or "DRM". DRM is widely accepted as a requirement for the distribution of media over the Internet.

Historically, copying of music was not as great a concern because of the nature of the media and the copying technology. Music was distributed on physical media such as tapes, CDs (compact disks) or vinyl albums, or via comparatively low-quality AM and FM radio transmissions. Copying content in such formats had severe shortcomings:
1. quality was not exceptional to begin with, and generally deteriorated when copied (digital CDs being a recent exception);
2. copies had to be physically transported between parties, which is generally slow, inconvenient and expensive relative to the retail price of the media being copied; and
3. copying was time consuming: copying a one hour vinyl album onto an audio tape, for example, took one hour to do.

Digital content (including software) was also distributed historically on physical media such as floppy disks or CDs. While this content is digital and thus does not deteriorate when properly copied, widespread copying is generally frustrated by the transporting difficulties and time consuming nature of the copying process described above.

However, with the emergence of pervasive digital communication networks like the Internet, the landscape has changed considerably. Digital content can now be copied with no reduction in quality, and distributed widely with almost no cost, effort or time.

To present a framework for discussion, an exemplary Internet system 30 will be described with respect to FIG. 1.

The Internet 32 itself is represented in FIG. 1 by a number of routers 34 interconnected by an Internet backbone 36 network designed for high-speed transport of large amounts of data. User's computers 38 may access the Internet 32 in a number of manners including modulating and demodulating data over a telephone line using audio frequencies which requires a modem 40 and connection to the Public Switched Telephone Network 42, which in turn connects to the Internet 32 via an Internet Service Provider 44. Another manner of connection is the use of set top boxes 50 which modulate and demodulate data onto high frequencies which pass over existing telephone or television cable networks 52 and are connected directly to the Internet via Hi-Speed Internet Service Provider 54. Generally, these high frequency signals are transmitted outside the frequencies of existing services passing over these telephone or television cable networks 52.

Web sites are maintained on servers 56 also connected to the Internet 32 which provide digital content and software applications to the User's computers 38. Communications between user's computers 38 and the rest of the network 30 are standardized by means of defined communication protocols.

Internet Service Providers (ISPs) 44, 54 or Internet Access Providers (IAPs), are companies that provide access to the Internet. ISPs 44, 54 are considered by some to be distinguished from IAPs in that they also provide content and services to their subscribers, but in the context of this document the distinction is irrelevant. For a monthly fee, ISPs 44, 54 generally provider end users with the necessary software, username, password and physical access.

Equipped with a telephone line modem 40 or set top box 50, one can then log on to the Internet 32 and browse the World Wide Web, and send and receive e-mail. Digital content can be widely distributed over this system 30 in a number of manners including:
1. posting content on Web sites stored either on the servers 56 or on the resources of the ISPs 44, 54 themselves;
2. employing peer to peer (P2P) software on a server 56 which allows users to access files stored on one another's computers 38; or
3. simply e-mailing the content files between users.

FIG. 1 is something of a simplification, as ISPs are often connected to the Internet 32 through Network Access Points (NAPs), rather than directly as shown in FIG. 1. As well, the Internet itself is far more complex than that shown in FIG. 1. However, these details would be well known to one skilled in the art and are not pertinent to the present discussion.

If the above problems could be overcome, not only would existing content be protected, but many other Content Owners would be encouraged to make their content and services available on the Internet and similar networks. This would result in far greater expansion of computer networks, content and services than even seen today.

There is therefore a need for a method and system of securely distributing media content over the Internet and similar networks, provided with consideration for the problems outlined above.

SUMMARY OF THE INVENTION

It is therefore an object of the invention to provide a method and system which obviates or mitigates at least one of the disadvantages described above.

One aspect of the invention is broadly defined as a method of distributing electronic media comprising the steps of: downloading a media file including an integral decryption engine and encrypted media content; requesting a decryption key from a remote server; and responding to receipt of the decryption key from the remote server by: decrypting the media content using the integral decryption engine.

Another aspect of the invention is defined as a computer readable memory medium for storing software code executable to perform the steps of: downloading a media file including an integral decryption engine and encrypted media content; requesting a decryption key from a remote server; and responding to receipt of the decryption key from the remote server by: decrypting the media content using the integral decryption engine.

A further aspect of the invention is defined as a carrier signal incorporating software code executable to perform the steps of: downloading a media file including an integral decryption engine and encrypted media content; requesting a decryption key from a remote server; and responding to receipt of the decryption key from the remote server by: decrypting the media content using the integral decryption engine.

BRIEF DESCRIPTION OF THE DRAWINGS

These and other features of the invention will become more apparent from the following description in which reference is made to the appended drawings in which:

FIGS. 7A and 7B presents a flow chart of a method of file distribution in a preferred embodiment of the invention;

DESCRIPTION OF THE INVENTION

Figure 1:
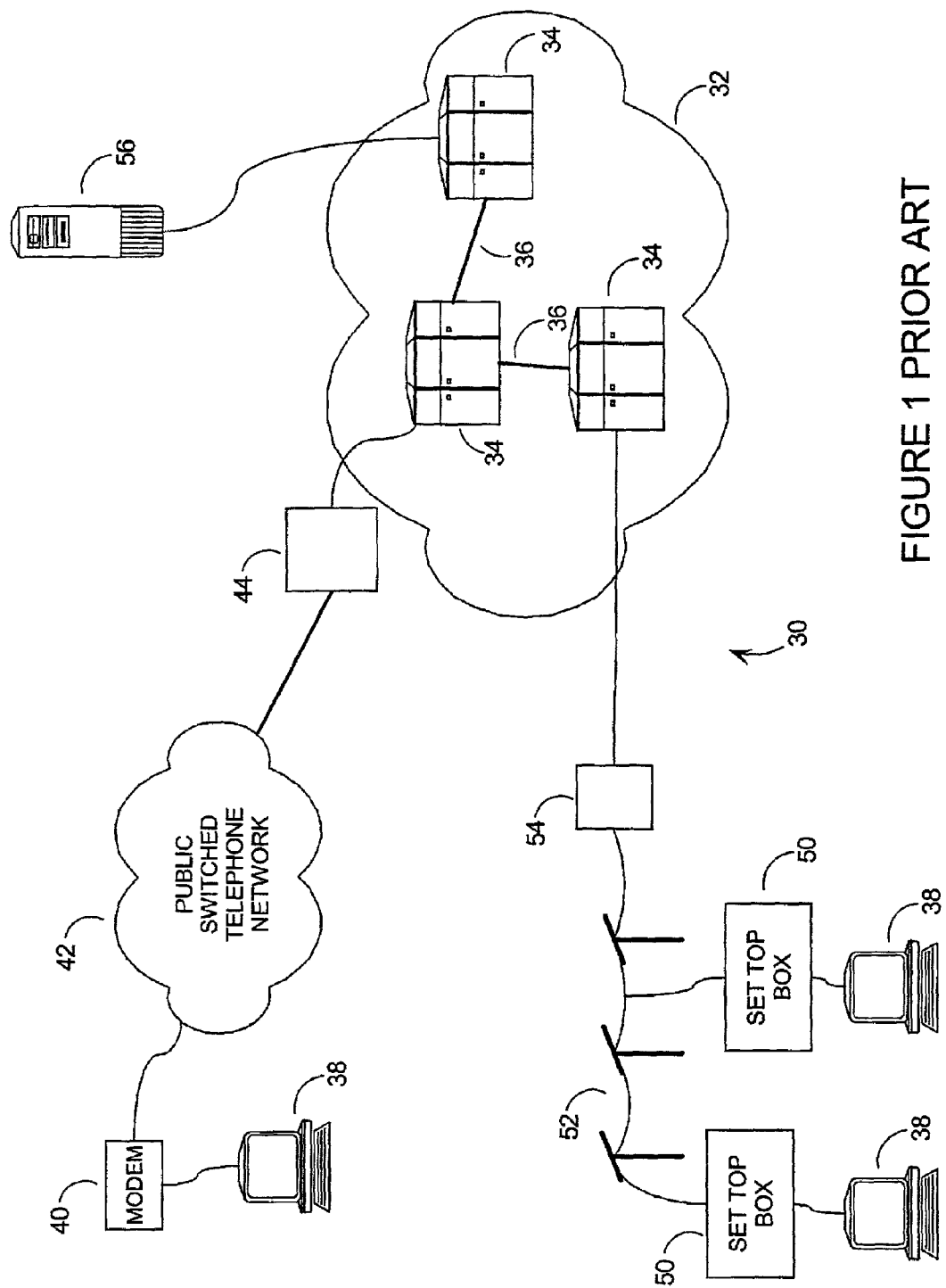
FIG. 1 presents a physical layout of an exemplary communication network as known in the art.
Figure 2:
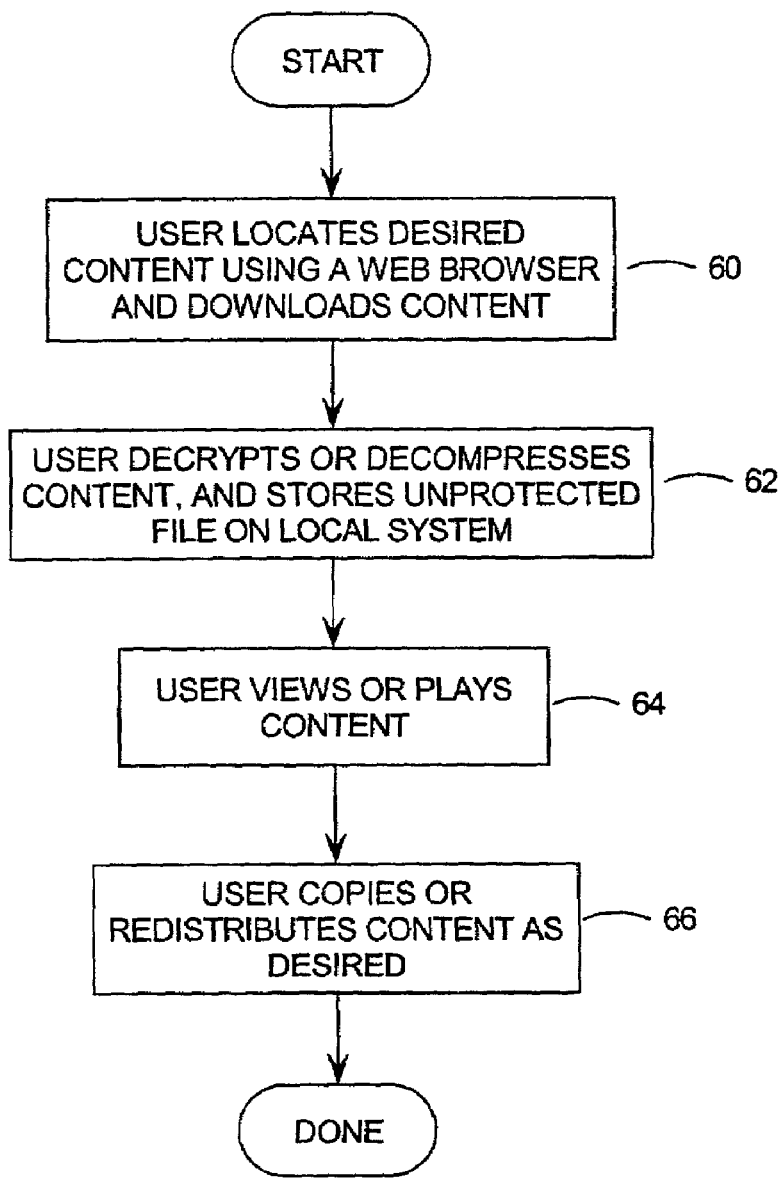
FIG. 2 presents a flow chart of an exemplary method of content distribution as known in the art.
Figure 3:
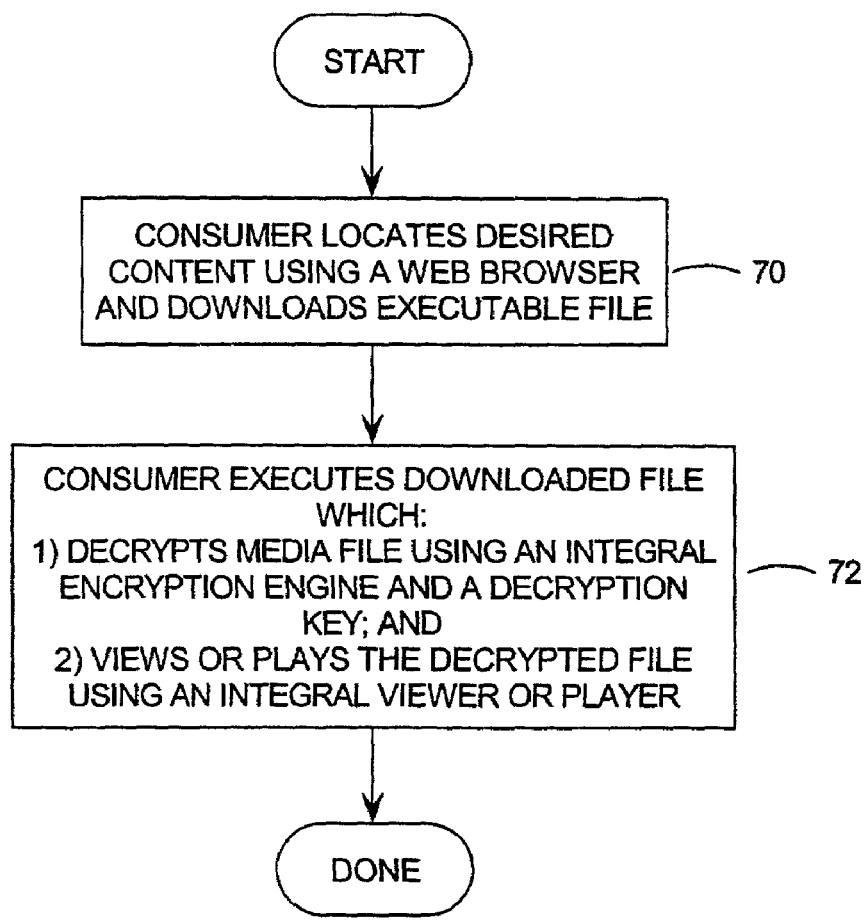
FIG. 3 presents a flow chart of a method of content distribution in a broad embodiment of the invention.

A methodology which addresses the objects outlined above, is presented as a flow chart in FIG. 3. This figure presents a method of managing distribution of proprietary electronic media where the user locates and downloads a single executable file containing the content he desires, at step 70. When this file is executed at step 72, it performs two tasks:

1. first, it decrypts the media file using an integral decryption engine and a decryption key; and then
2. it presents the decrypted content of the media file to the user, using an integral viewer, player or other suitable software application.

The user may locate and download the content he desires in many ways, as known in the art. This may include, for example:

1. downloading content posted on a Web site stored either on a web server 56 or on the resources of an ISP 44, 54 or ASP;
2. downloading content from another computer 38 in a peer to peer (P2P) network such as Napster or Gnutella; or
3. receiving a media file via e-mail from another user or company.

This download may be received over any suitable communication network as known in the art, and may consist of several different networks working together. Such networks would include wireless networks such as cellular telephone networks, the public switched telephone network, cable television networks, the Internet, ATM networks, frame relay networks, local area networks (LANs) and wide area networks (WANs). The device employed by the user to perform these method steps may be a personal computer (PC), smart terminal, television set top box, personal digital assistant (PDA), Internet-ready telephone or other similar device. Such devices are well known in the art.

The nature of the media file that has been requested does not limit the scope of the invention. This document generally describes music files because of the current demand in that market, but any content could be distributed with this method including text, graphics, video, audio files, executable applets, data files or software files. Media content that is currently distributed physically could easily be distributed in this manner, including books, magazines, newspapers, promotional multimedia, technical journals, music videos, movie trailers and complete movies. Accordingly, the viewer or player may be of any type known in the art, that corresponds to the nature of the media content being downloaded.

The type of encryption employed also does not limit the invention. Asymmetric encryption techniques such as PGP, Diffie-Hellman and RSA are preferred, but symmetric techniques may also be employed. Asymmetric encryption techniques are those which employ private and public key pairs, one key being used for encryption, and one for decryption. Symmetric techniques use a single secret key, the same key being used for both encryption and decryption.

The concept that is most important in the invention, is that the content, decryption engine, and viewer or player, be downloaded and executed as a single, executable file. The decryption key is not generally integral within this executable file, as downloading it independently provides an additional layer of security. This is discussed in greater detail hereinafter. In this manner, the invention of FIG. 3 addresses the problems in the art as follows:

1. it improves ease of use: The user does not have to configure several independent software programs such as: decompression, decryption, player or viewer. The user simply executes a simple downloaded file. Hence, the method of the invention is more likely to work correctly;
2. it is more difficult to attack, because it does not have the discrete components and stored intermediate files that multi-step methods do; and
3. it protects the content, because a decrypted file is never stored on the client, only the encrypted version. Thus, the client can only copy or transmit the encrypted version, and not the decrypted version of the media content.

Thus, the digital media distribution system of the invention enables Content Owners to distribute their content in a secure digital format through the Internet and other networks rather than on a physical media.

It is also possible to obtain some of the benefits of the invention by implementing portions of it. For example, in applying the invention to a MacIntosh™ environment, it may be necessary to download the media player separately rather than integral with the downloaded media file. In such a case, the decryption engine can be configured to automatically launch the external player without having a decrypted copy of the media file stored locally.

The preferred embodiment of the invention as described hereinafter, adds further features which allow the content files to be securely redistributed and passed along to other users. As well, the media content file contains electronic commerce capabilities and digital rights management ensuring that revenues are distributed to the respective rights holders.

DESCRIPTION OF THE PREFERRED EMBODIMENT

The preferred embodiment of the invention will now be described with respect to FIGS. 4 through 11. These figures present an implementation of the invention in the context of music file distribution, but of course, the invention may be applied to many other types of media files. Because of the application to music, the song files are stored in MP3 format and the components of the system are refered to as MPE™ components (for MP3 Encrypted).

The system of the invention is a complete, secure, media distribution system, with built-in e-commerce, digital rights management, distribution and visual display. It combines a DRM solution with an e-commerce system and clearinghouse function, wrapped up in a secure and accessible delivery system.

MPE files do not require an external player or any other lengthy downloads, as each file contains an embedded player; MPE files automatically play when clicked on. The system of the invention works on both PC and Macintosh platforms and can easily be implemented on other platforms. It is a much richer and more powerful marketing tool than any other system on the market today.

In the preferred embodiment, MPE files can be distributed through three different pricing models. The first is Free, which provides no security, but does enhance the content with a rich media experience. The second model is Pay, which allows consumers to preview a section of the track at full quality before they are prompted to pay money to unlock the remainder of the track. The third model is Sponsored, which allows consumers to preview a section of the track at full quality before they are prompted to view a sponsor's Website (advertisement) to unlock the remainder of the track.

There are a number of further inventive concepts employed by the preferred embodiment which result in numerous additional benefits to consumers and content providers. One of the major concepts is that of bonding a purchased media file to the user's computer and transmitting this bonding information back to an MPE server which is administrating the purchase of the MPE file. This technique offers many benefits, including:

1. it offers a further safeguard against copying of content files as the bonding will only allow the downloaded file to be played on one specific system—the one to which the content file has been bonded;
2. it allows mobility as the Consumer can move rights from one computer to another. This is important as varied Internet based devices become more common (PDAs, PCs, laptop computers, Internet-ready cellular telephones, etc.) and users have more than one such device. A user could download a file to a MP3 player, for example, if it is Web connected;
3. it allows recovery in the event of a hardware failure on the Consumer's equipment. For example, if the user's computer crashes and he loses access to the MPE files he has downloaded, he can simply authenticate himself to the MPE Server and obtain new licensed copies; and
4. it provides an additional level of authentication for the user.

Figure 4:
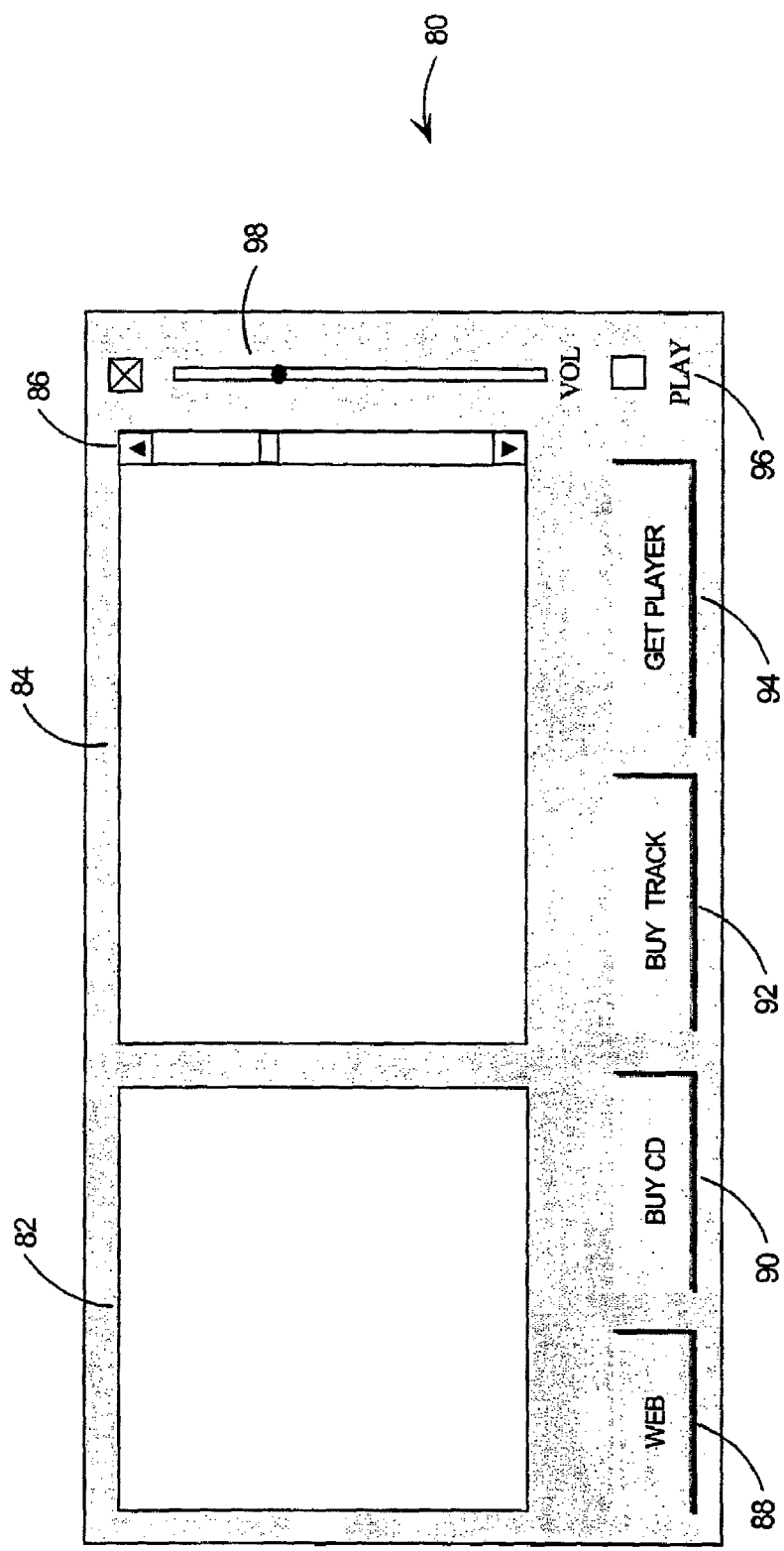
FIG. 4 presents a layout of an MPE Interface screen in a preferred embodiment of the invention.

The preferred interface 80 on the Consumer side is presented in the diagram of FIG. 4. This is the display that will appear to the end user when he executes a media file encrypted in the manner of the invention (referred to as MPE files hereinafter). This interface 80 is designed to be logical and intuitive, providing sufficient flexibility for powerful branding possibilities, while allowing consumers to easily grasp what they are dealing with.

The MPE interface 80 includes a graphics window 82 which may display an album cover or other graphics, allowing for branding and product association. The graphics window is a full-colour 128×128 pixel bitmap. Other pixel configurations and data formats such as GIF, JPEG or TIFF, could also be used. The flexibility of this and other elements in the MPE interface 80 will become more clear from the description of other elements of the invention which follow.

A text box 84 is also included which may display unlimited text in rich text format (rtf) or a similar format. The background colour can be modified, as well as font, font colour, and alignment on a character by character basis. Font selection includes all standard Web fonts available on both Windows™ and MacIntosh™ operating systems. The text box 84 has a vertical scroll bar 86 which allows the user to quickly scan through the presented text.

Control buttons are preferably provided as follows:
1. a "Web" button 88 which provides links to the Web site of the artist or recording label, allowing the Consumer to obtain additional or related information;
2. a "Buy CD" button 90 which provides a Web link to buy the CD. Clicking on this button can direct consumers to any Web site selling the CD or other related merchandise. Alternatively, this button could be used as a secondary Web link;
3. a "Buy Track" button 92 which initiates the purchase process. Clicking on this button takes the Consumer to a Buy screen, in which the text box 84 and button set 88-94 are replaced with text and buttons appropriate to the purchase process (described in greater detail with respect to FIGS. 7A and 7B); and
4. a "Get Player" button 94 to install a full-featured player application, allowing construction of playlists, support of other common formats, full transport controls and Internet radio reception. As single tracks are downloaded in executable format, it is not necessary to download the player separately in order to perform standard functions.

The MPE interface 80 also includes the most commonly used player controls: a play pushbutton 96 and volume control 98, so the user can play tracks without having to install a full player application.

Media File Structure

Figure 5:
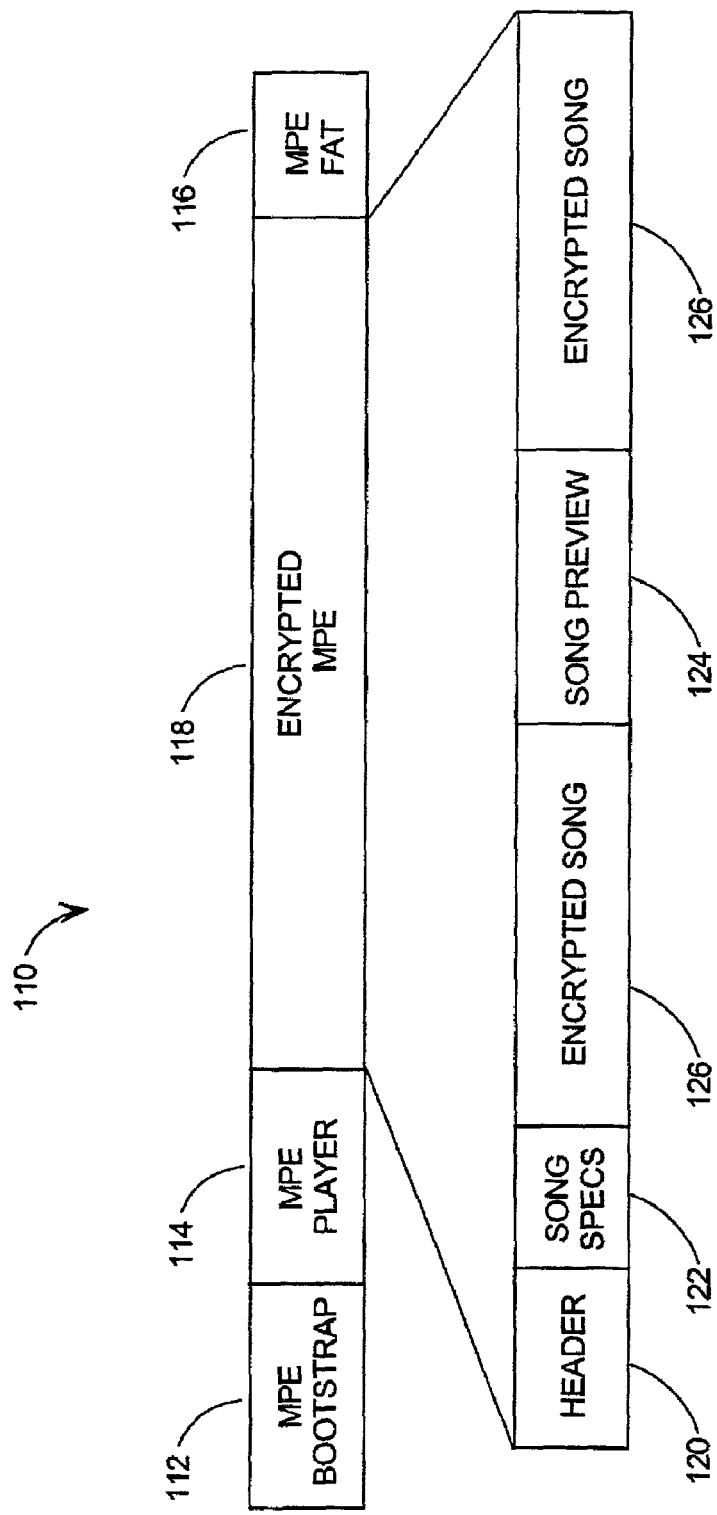
FIG. 5 presents a diagram of the MPE file structure in a preferred embodiment of the invention.

Each MPE file has the same file structure, no matter which track is encoded within it. FIG. 5 presents a layout of the preferred file structure.

When an MPE file 110 is executed, the MPE Bootstrap 112 un-compresses and launches the MPE Player 114, which is compressed to allow for efficient download and transfer of the MPE file 110. The MPE Player 114 is actually the fully functional Destiny Media Player, but the MPE Player 114 does not install unless the user clicks on the "Get Player" button 94 on the MPE interface 80.

The File Allocation Table (FAT) 116 simply tells the user's computer 38 where the different parts of the MPE file 110, such as the MPE Bootstrap 112 and MPE Player 114, begin and end. This is required, for example, so that the user's computer 38 does not attempt to play audio from the MPE Player 114 program data.

Contained within the Encrypted MPE section 118 are several elements.

The Header 120 confirms that the file is structured in MPE format, so that the MPE Player 114 interprets the data correctly.

The Song Specification block 122 contains several pieces of data, including:
- the Song ID;
- Distributor ID (and whether that Distributor has an exclusive license to the content);
- the Type of file (MP3, WAV or AVI for example);
- playback length of the content in seconds; and
- data as to where the Song Preview section 124 begins and ends, and whether or not it fades on its beginning and ending.

The Song Preview section 124 is not as strongly encrypted as the remainder of the song, being encrypted with a weak 32 bit key stored in the header 120. This does, however, prevent consumers from extracting that audio information without an MPE player.

The surrounding song 126 is encrypted such that it can only be played on the hardware on which it was purchased (bonding to the user computer 38 as described above). If the content has not been purchased, only the Song Preview section 124 can be accessed. Note that any portion of a song can be identified as the Preview Section 124, for example: the first minute, all of the song, or none of it at all. The example presented in FIG. 5 shows a portion in the middle of the song.

Flow of Information

Figure 6:
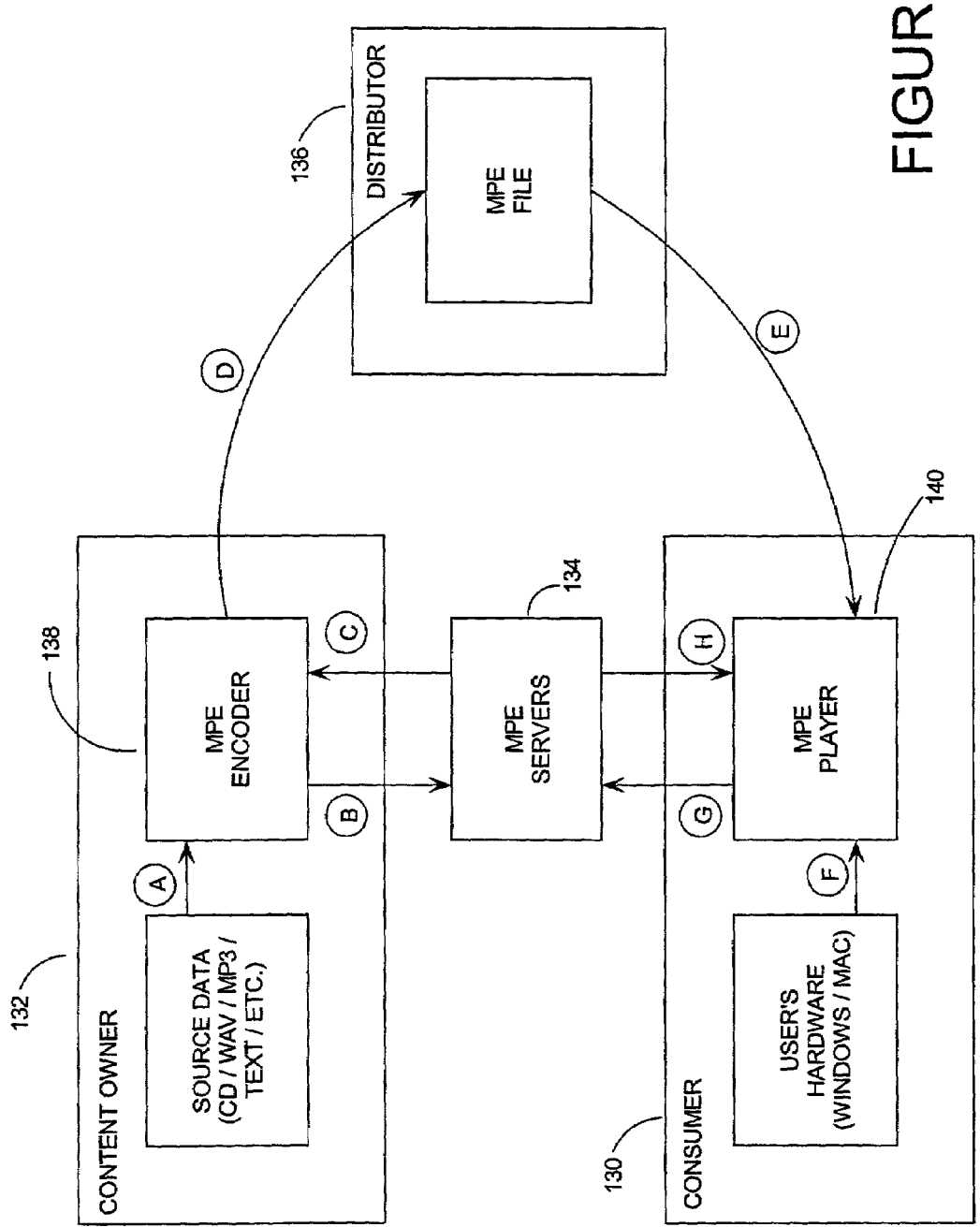
FIG. 6 presents a diagram of information flow in a preferred embodiment of the invention.

In the preferred embodiment, there will generally be four parties, as presented in FIG. 6: the Consumer 130, the Content Owner 132, MPE servers 134 and the distribution server 136. It is possible of course, for a single party to perform the functions of more than one of these entities, or for information to flow through different channels. These variations would be clear to one skilled in the art from the description of the invention herein.

Note that the MPE Servers 134 are referred to in the plural, because their functionality may be implemented by multiple, independent servers.

The process comprises two phases. During the first phase, the Content Owner 132 interacts with the MPE Servers 134 and the distribution server 136 to encrypted content into an MPE file 110 and to make listings of it available on the distribution server 136. In the second phase, the Consumer 130 interacts with the MPE Servers 134 and the distribution server 136 to identify and download the desired content, to preview it, then to decrypt it if he so desires.

The path in which information flows in the exchange of information between the MPE Encoder 138 and the MPE Servers 134, or between the MPE Player 140 and the MPE servers 134, is transparent to both the Content Owner 132 and the Consumer 130.

In detail, the hidden flow of information as it passes from Content Owner 132 to the Consumer 130 may be described as follows, the letters below referring to the reference letters in FIG. 6.

A First, source data (CD, WAV or MP3, plus image and text information) is input into the MPE Encoder 138, by the Content Owner 132 from which the MPE Encoder 138 determines the Song Information. The Song Information does not contain the song itself.

B The MPE Encoder 138 then transmits the Song Information to the MPE Servers 134, where it is stored in an MPE database. The MPE database generates a Song ID for that specific file. The MPE servers 134 also generate a Song Key for the purpose of encrypting the song. The Song Key is used to add encrypted digital rights to the media file 110. These rights include a description of who should be compensated, and how much they should receive for each download. The media files 110 can now be made freely available anywhere on the World Wide Web, with the security that the artist will be paid for each download that is executed. Note that the song itself is not stored on the MPE servers 134.

C The MPE servers 134 send the Song ID and Song Key to the MPE Encoder 138. The MPE Encoder 138 uses the Song Key to encrypt the Song.

D The MPE Encoder 138 generates an MPE file 110 as described with respect to FIG. 5, which is encrypted and contains the Song ID. This MPE file 110 can now be distributed, and is sent to one of the distributor servers 136. This completes the first phase of the process.

E The Consumer 130 may then download a desired MPE file 110 and play the preview section 124 of the MPE file 110 on his hardware, using either the built-in MPE Player 140 or a compatible player already installed on his system 38.

F The MPE Player 140 obtains a "digital fingerprint" of the users computer 38 or registration ID of the portable device, to determine the User Key. This is how the executable file will be bonded to the user's computer 38.

G When the Consumer 130 elects to purchase or otherwise unlock the encrypted section 126 of an MPE file 110, the MPE Player 140 sends the Song ID, User Key, Distributor ID, User ID and User Password to the MPE servers 134.

H If this information can be authenticated, and it is confirmed that the e-commerce model can be executed, the MPE servers 134 send a copy of the Song Key encrypted with the User Key to the MPE Player 140. This encryption of the Song Key is different than the encryption of the song. Once the MPE Player 140 has this Song Key, it can decrypt and play the song. In the preferred embodiment, the e-commerce model uses a "digital wallet" in which Consumers 130 set up accounts at the MPE servers 134 by depositing a sum of money which can be debited against. This model is described in greater detail hereinafter.

After the file is purchased, the MPE Servers 134 track and distribute the revenue as per the royalty payment defined by the encoding process.

Process from Perspective of the Consumer

Figure 7A:
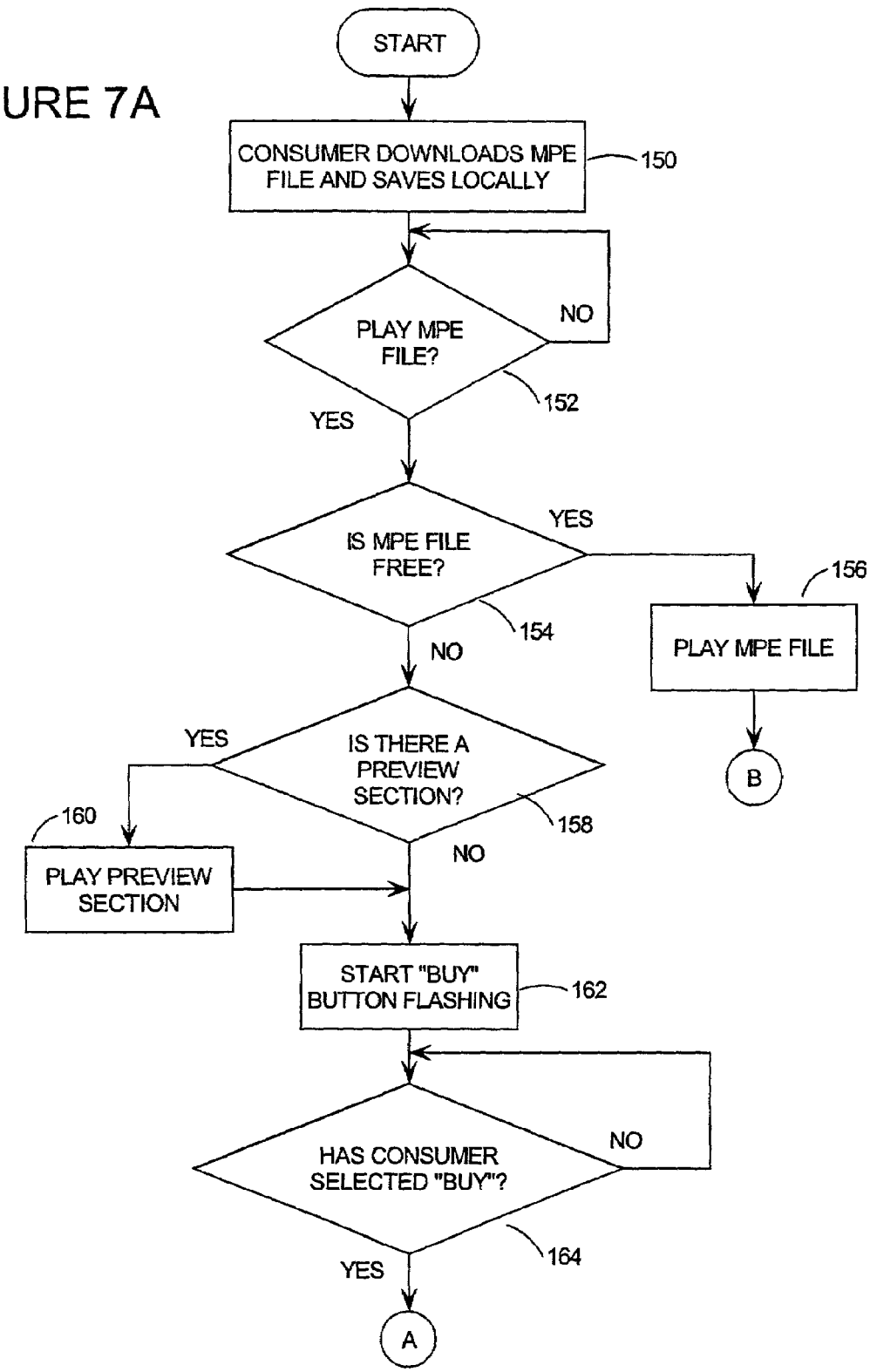

A detailed flow chart of the MPE delivery system is presented in FIGS. 7A and 7B.

The process begins when the Consumer 130 downloads an MPE file 110 in some manner, at step 150. As described above, files are typically downloaded from the Internet utilizing a standard Web browser, but this step is not necessary if the Consumer 130 already has the MPE file 110 on their hard drive or on a CD-ROM, or if the MPE file 110 was e-mailed to them. This step is only required if the Consumer 130 is downloading the file from the Internet 32.

In an e-commerce environment, the Consumer 130 will typically search for MPE files 110 using a search engine, or by visiting known distributors of MPE files 110. When an MPE file 110 of interest is found on a Web page, the Consumer 130 clicks on a link to download the file. The Consumer 130 is then prompted to identify a location on their local system 38 in which to save the MPE file 110, generally on a hard disk.

Once the download is complete, the Consumer 130 can play the MPE file 110 by electing to OPEN it from the download dialogue, or by double-clicking on the MPE file 110 itself at step 152. The MPE file 110 will begin playing almost immediately upon opening, and graphics and text will be displayed.

Note that many of the decision steps in this flowchart are presented as loops, step 152, for example, looping back to itself until a "yes" selection is made. This is a simplification of the actual implementation which allows the Consumer 130 to leave this routine at any time, either to download a new MPE file 110, or to exit the system altogether. It would be clear to one skilled in the art, how to implement such standard features.

If the MPE file 110 is identified as free at step 154, the Consumer 130 will be able to play the entire audio track at step 156 and the Buy Track button 92 will not flash. The routine is then completed.

If the MPE file 110 is not free, then the routine will determine whether there is a preview portion of the audio track at step 158, and if so, the preview section 124 will be played at step 160. Regardless of whether there is a preview section 124 to play, the Buy Track button 92 will then begin to flash at step 162.

If the Consumer 130 selects the "Buy" option by clicking on the Buy Track button 92 at step 164, there are two possible purchase process models in the preferred embodiment: Pay and Sponsored.

The Pay model is one in which the Consumers 130 will have to pay a fee in order to obtain access to the complete and decrypted MPE file 110. Upon completing playing the preview portion 124, the Consumer 130 is asked if they wish to purchase the song. If the Consumer 130 selects "No", they will only be able to access the preview portion 124. If they select "Yes", they will have to go through registration if they have not done so previously. If they have already registered, they will be taken to the "Buy" screen of the MPE Interface 80.

With the "Sponsored" model, the cost of the MPE file 110 is covered by a Sponsor so the Consumer 130 can access it at no cost. However, the Sponsor will generally require the Consumer 130 to perform certain acts in exchange for the access, for example, requiring the Consumer 130 to visit the Sponsor's Web site. Many other purchasing models would be clear to one skilled in the art from the teachings herein. The invention is not limited to the specific implementations presented.

Thus, if it is determined that the MPE file 110 is sponsored at step 166 of FIG. 7B, then control passes to step 168 where the Consumer 130 is given the option of visiting the Sponser's Web site in exchange for having access to the balance of the MPE file 110. If the Consumer 130 selects "No", then the routine terminates, having allowed the Consumer 130 to access only the preview portion 124 of the MPE file 110. If the Consumer 130 selects "Yes", their default Web browser will open to the Sponsor's Web site at step 170 and the balance MPE file 110 will be unlocked at step 172 by transferring the "Song Key" from the MPE servers 134 to the Consumer 130. The MPE file 110 will begin immediately playing from start to finish at step 174.

If the MPE file 110 is identified as "Pay" model based at step 166, then control passes to step 176 where it is determined whether the Consumer 130 is registered. If the Consumer 130 is not registered, control passes to step 178 where the Consumer 130 obtains registration by entering an e-mail address and a password or PIN (personal identification number). For purposes of verifying identity in the event of a lost PIN, the Consumer 130 is also prompted to enter in a personal question with an answer which only they would know.

Once registered, the Consumer 130 is taken to the Buy screen of the MPE interface 80 at step 180. The Consumer 130 is shown their number of credits and the cost of the track, as well as the projected balance of credits should they decide to purchase the MPE file 110. A discussion of the preferred credit system is outlined hereinafter. While the preferred embodiment employs a credit or "digital wallet" system, any other electronic commerce solution may be employed including credit cards, debit cards, smart cards or e-cash.

Control then passes to step 182 where the Consumer 130 is given four choices:
1. to "Buy" the current MPE file 110;
2. to "Cancel" the transaction;
3. to "Review" their purchase history; or
4. to "Buy Credits".

Details of how these four selections could be executed would be clear to one skilled in the art from the description herein, and would vary widely with the nature of the electronic commerce solution being employed.

For example, if the Consumer 130 has sufficient credits to buy the current MPE file 110, they may proceed with the purchase process. Clicking on the "Buy" button prompts the Consumer 130 to identify himself by entering his Password or PIN. If he has forgotten his Password, a new replacement password can be emailed from the MPE servers 134 to the Consumer 130.

If the Consumer 130 has sufficient credits to purchase the track and has authenticated himself (i.e., has entered his Password correctly), the purchase will be processed and he will be notified that the transaction is completed. Clicking "OK" will immediately unlock the MPE file 110 and begin playing the MPE file 110 from start to finish.

If the Consumer 130 does not have sufficient credits to purchase the MPE file 110, they will need to buy credits. Clicking "BUY CREDITS" from the Buy screen of the MPE interface 80 will open up the MPE Secure Credit Purchase Web site on the consumer's default Web browser. Here the Consumer 130 is prompted to identify himself by entering his PIN. After successfully authenticating himself, the Consumer 130 is given the choice of buying credits in $10, $25, $50 or other-sized blocks.

Having selected the number of credits they wish to purchase, the Consumer 130 is prompted to verify that this is the number of credits they wish to purchase. If they select "No", they are allowed to enter another amount and proceed with the credit purchase. If they select "Yes" they are prompted to enter their billing and credit card details.

Having submitted their credit card details, the Consumer 130 is presented with an itemized and totaled transaction summary for verification. The summary includes appropriate sales or other taxes. If the summary is acceptable to the Consumer 130, they click "Process my order".

If the credit card information submitted by the Consumer 130 was correct, they are informed that the transaction has been approved and they are shown their new credit balance. If the credit card information is invalid, the Consumer 130 is prompted to re-enter their details.

The credit information in the MPE Buy screen is now updated and the Consumer 130 can complete the purchase process.

If the Consumer 130 clicks on the "Cancel" button, the transaction is terminated. If the Consumer 130 selects "Review Purchase History", a summary of his previous transactions is downloaded to him from the MPE servers 134.

MPE Encoder

Figure 8:
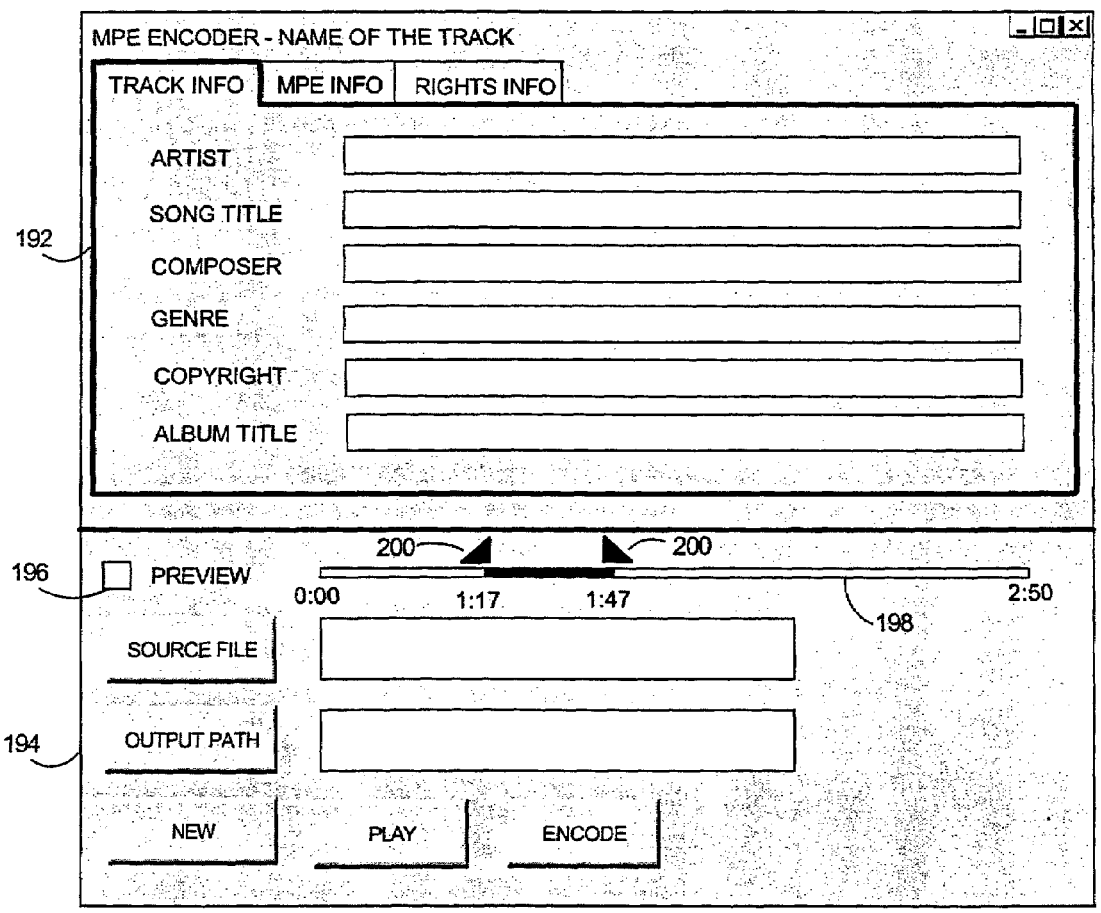
FIG. 8 presents a layout of the Track Info screen of the MPE Encoder in a preferred embodiment of the invention.
Figure 9:
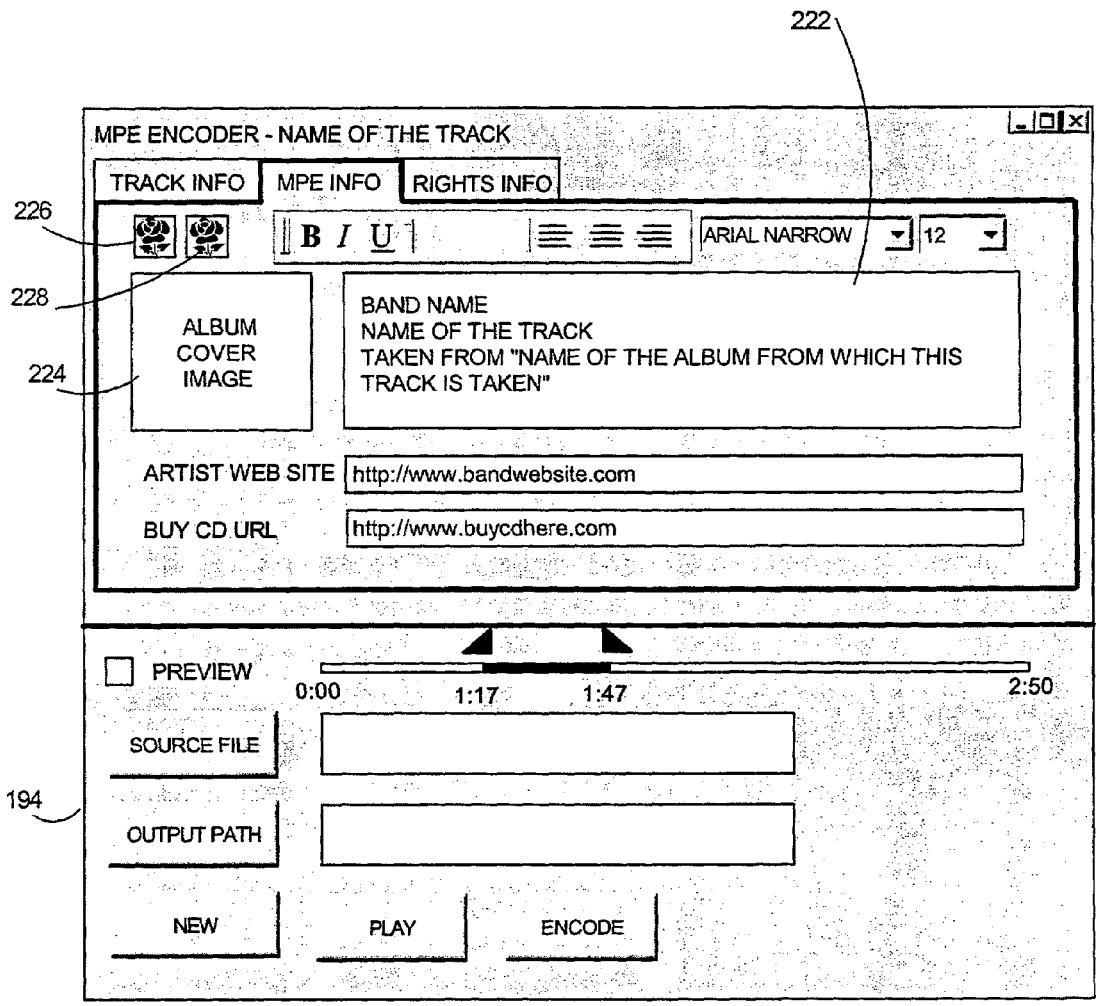
FIG. 9 presents a layout of the MPE Info screen of the MPE Encoder in a preferred embodiment of the invention.
Figure 10:
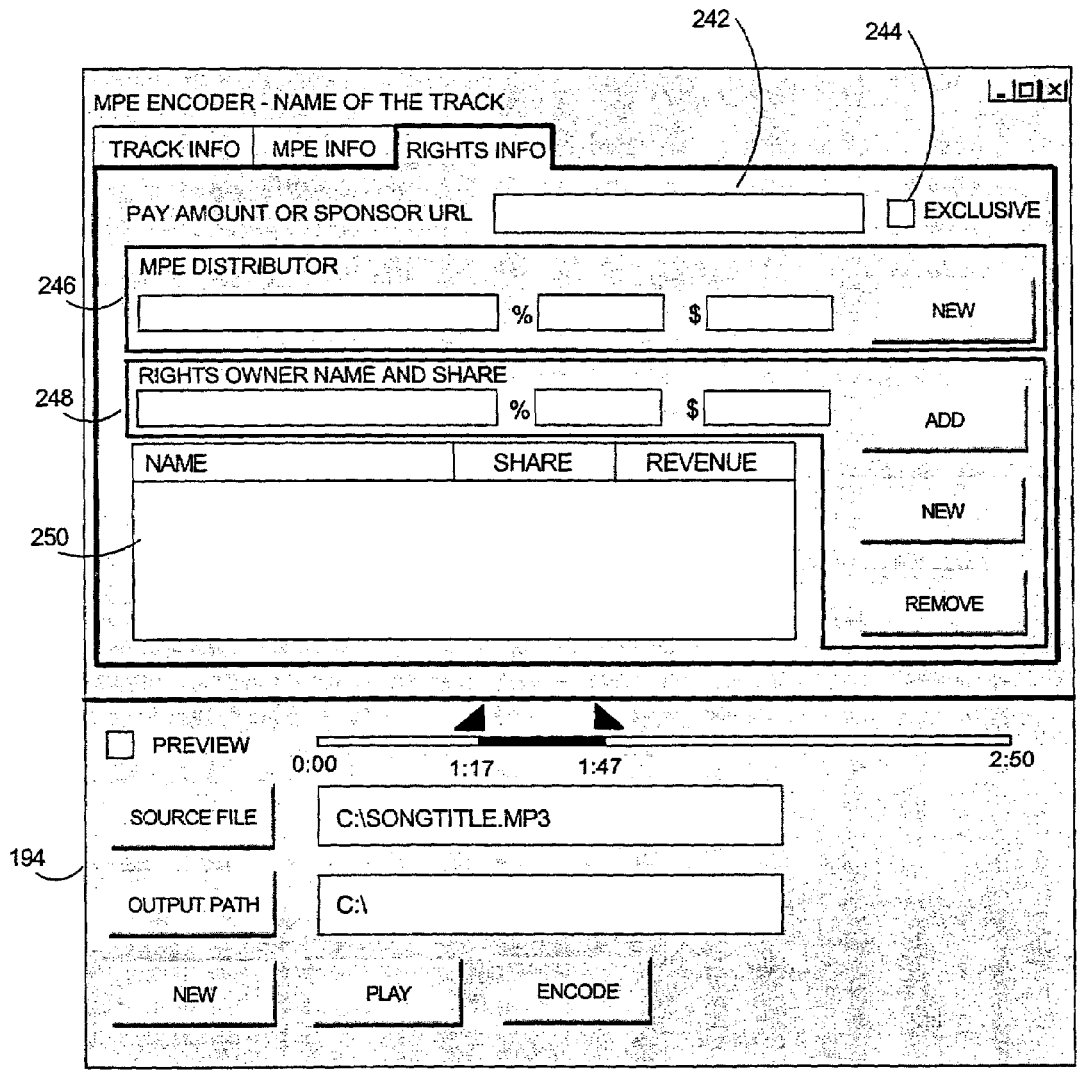
FIG. 10 presents a layout of the Rights Info screen of the MPE Encoder in a preferred embodiment of the invention.
Figure 11:
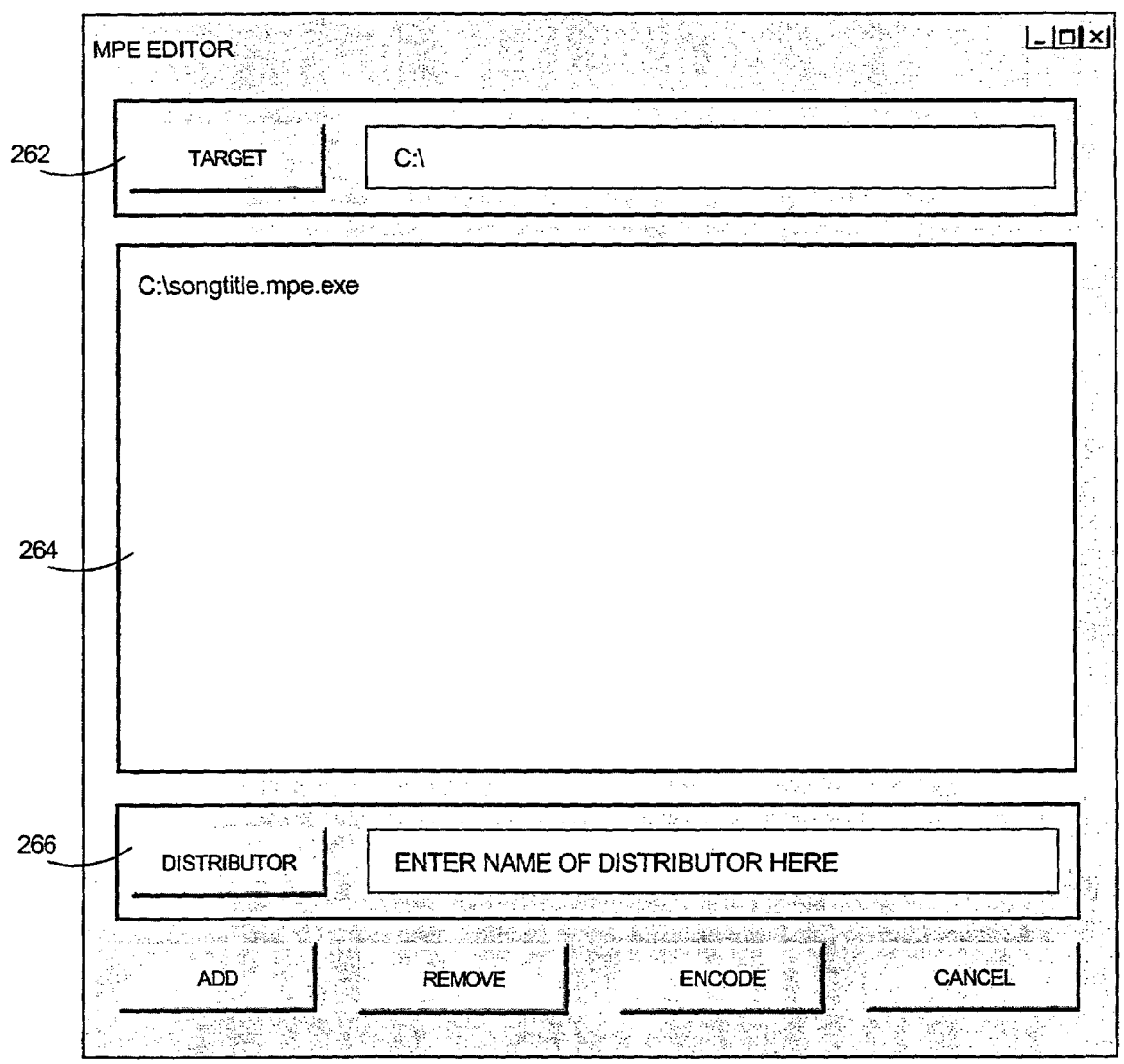
FIG. 11 presents a layout of the MPE Editor screen in a preferred embodiment of the invention.

MPE files 110 are generated by the Content Owner 132 using the MPE Encoder 138. The MPE Encoder 138 is designed to make the creation of secure files easy and quick, while providing a wide range of flexibility for the establishment of branding. FIGS. 8, 9 and 10 present the three main screens that interface the Content Owner 132 with the MPE Encoder 138.

FIG. 8 presents the layout of the "Track Info" screen 190, which consists of two panes 192 and 194. The upper pane 192 has labels and fields which allow for the entry of basic track information, such as: artist, song title, composer, genre, copyright information and album title. This information is automatically entered into the MPE file 110 as ID3 tags. ID'tags are 128 byte data blocks that are attached at the end of the audio data in an MP3 file. ID3 tags are known in the art, and are used to carry non-audio information relevant to an MP3.

Different information fields may be included in such a pane 192 particularly if the invention is being applied to a different media, such as magazine articles.

Information entered into the Track Info screen 190 is automatically carried forward to the MPE Info screen 220 in FIG. 9, where it is used to generate default content for the MPE text box 222.

The lower pane 194 of the Track Info screen 190 (from "Preview" to the bottom of the window) is a common pane shared by all three screens in the MPE Encoder 138.

Checking the Preview box 196 will indicate whether the identified song includes a preview section (in the case of a Pay or Sponsored track) or not (in the case of a Free track).

The bar 198 beside the Preview check box 196 allows for selection of the Preview section 124 on the basis of time. The Preview section 124 can be of any length, from 0 seconds to the entire length of the song. Preview lengths typically vary from 20 to 60 seconds, with 30 seconds being the most common length. Clicking and dragging either edge of the selected Preview section 124 allows for movement of the beginning or end of the Preview section 124 without affecting the other extreme. In the example of FIG. 9, a song with a length of 2 minutes and 50 seconds is presented, with the Preview section 124 running from 1:17 to 1:47 of the elapsed time of the song. Clicking and dragging the middle of the selected Preview section 124 allows for movement of the entire Preview section 124 without affecting its overall length.

Double-clicking on either of the triangular markers 200 at the extremes of the selected Preview section 124 toggles between a straight start/stop or a fade. These approaches can be combined (for example, a straight start with a faded ending, or vice versa). The example shown in FIG. 8 indicates a fade on both the beginning and the end of the Preview section 124.

The "Source File" field allows for the selection of a source file for encoding into MPE format. The source file can be an MP3, WAV, AVI, audio CD or similar audio file. If the source is WAV or audio CD, the resultant MPE file 110 will be encoded at 128 kbps. If the source is in MP3 format, the MPE file 110 will be encoded at a bit rate equal to that of the source MP3, allowing for higher quality MPE files 110 (with longer file lengths). Source file names could be entered into this field in a number of other manners known in the art such as: being dragged and dropped, cut and pasted, or being located on the Content Owner's system using a "browse" button.

The Output Path field indicates where the new MPE file 110 will be stored. As a default the new MPE file 110 will be written with a file name of "[Source File].MPE.EXE" where [Source File] is the portion of the Source File's name before its .MP3, .WAV, or .CDA extension. If a file by that name already exists in the Output Path, a number (1, 2, 3 etc.) will be appended to the end of the file name before the ".MPE-.EXE" extension.

Clicking on the "New" button will erase all entered data and start the MPE encoding process again, for the entry of an entirely new MPE file 110.

Clicking on the "Play" button will play the Preview section 124, allowing the Content Owner 132 to test and edit the Preview section 124. While the Preview section 124 is playing, this button reads "Stop", and clicking on it will stop the playback.

Clicking on the "Encode" button will begin the final stage of the encoding process and write the MPE file 110 to the location given in the "Output Path" field. While encoding is being performed, this button reads "Cancel", and clicking it will end the encoding process.

The preferred layout of the MPE Info screen 220 is presented in FIG. 9. This screen serves primarily to establish branding and deliver rich content associated with the MPE file 110.

As noted above, information entered into the Track Info screen 190 of FIG. 8 will automatically generate default content for the MPE text box 222. The text box 222 is in rich text format, and allows for the background colour to be changed to any true colour value. Font, colour, size and attributes (bold, italic, underlined) can all be adjusted on a character by character basis, and alignment (left, right, centered) can be adjusted on a line by line basis. Rich text can be cut from other files or external applications and pasted into this panel.

An album cover image or similar graphic file can be included with the MPE file 110, by loading it into the album cover window 224. This graphic file can be of any format known in the art, including a bitmap, JPEG or GIF. In the preferred embodiment, a bitmap of 128 by 128 pixels in size is used. If the Content Owner 132 provides an image not matching these dimensions, it will be scaled (maintaining the aspect ratio) such that its largest dimension is equal to 128 pixels in size. The small flower buttons 226, 228 above the album cover image open and close image files. Graphics can be dragged and dropped or cut and pasted, into this panel.

Fields for entry of two URL (uniform resource locator) links are also provided in this pane: Artist Web Site and Buy CD. These entries will correspond to the "WEB" and "BUY CD" buttons on the MPE Interface 80, respectively, described with respect to FIG. 4 above. URLs are the addresses used on the Internet to locate resources, and their use is well known in the art. In the preferred embodiment, the only URLs permitted in these lines are ones beginning with "http://" or "mailto:". If an entry is made that does not begin with either of these, "http://" will be automatically appended to the beginning of the entry.

The MPE Info screen 220 provides an important contribution in the enhancement of branding which will be of great value to Content Owners 132.

As noted above, the lower pane of the MPE Info screen 220 is the same "Preview" pane 194 that appears on the Track Info screen 190 of FIG. 8, and is described above.

FIG. 10 presents the final screen in the MPE Encoder 138, the Rights Info screen 240. This screen provides all the information required by the digital rights management (DRM) aspects of the invention. If a track is free (no preview), this screen is unnecessary and disappears entirely.

The "Pay Amount or Sponsor URL" field 242 allows for entry of a price in US dollars for a Consumer 130 to purchase the MPE file 110, or for the entry of a URL that Consumers will be forced to view in order to unlock the MPE (generally this will be the Sponsor's URL). The Pay and Sponsored models are separate and cannot be combined, therefore the Content Owner 132 must determine which model to use while in this entry. The "Exclusive" check box 244 allows a file to be reserved for one specific distributor 136, such that no other distributor can modify the MPE file 110 or be paid for sales of the MPE file 110.

The "MPE Distributor" field 246 allows any previously entered distributor 136 to be selected from a pull down menu, or for a new distributor 136 and the entry of all their details to be created. Compensation can be in terms of a percentage of gross revenues, or based on a flat rate. In the preferred embodiment, the distributor percentage field is set to default at 25% of gross receipts. If the "Exclusive" check box 244 has been selected, this distributor 136 will be the only one who can profit from the distribution of this MPE file 110.

As only one MPE Distributor 136 may be specified at a time, there is only one control button associated with the MPE Distributor field 246—the "New" button. Clicking on this button will erase the current entry in the MPE Distributor field 246 allowing a new entry to be made.

The "Rights Owner Name and Share" field 248 is set up in a similar manner, allowing for the choice of any previously entered rights owner from a pull down menu, or for the creation of a new rights owner and the entry of all their details. The Rights Owner Share can be set at anything from 1% to 50%, but in the preferred embodiment, all Rights Owners must total 50%.

The Rights Owner Name and Share field has three control buttons associated with it: Add, New and Remove. The Add and Remove buttons simply allow the Content Owner 132 to add and remove Rights Owners to and from the summary window 250. The "New" button deletes the text currently entered into the editing window.

Like the Track Info 190 and MPE Info 220 screens described in FIGS. 8 and 9, the lower pane of the Rights Info screen 240 also includes the same "Preview" pane 194 that is described above.

MPE Distributor Editor

The preferred embodiment of the invention also includes an MPE Distributor Editor: a software application which allows Web sites or other businesses which distribute MPE files to alter existing MPE files 110 such that they become the paid distributor 136 for any files sold through their distribution chain. The preferred layout of the MPE Distributor Editor interface 260 is presented in FIG. 11.

Distributor 136 information is contained outside the encrypted portion of each MPE file 110, which allows it to be modified without violating the security of the file. The MPE Distributor Editor makes a copy of each MPE file 110 loaded into it, modifying only the Distributor 136 information.

The "Target" button and associated field 262 identifies the location where the modified MPE files 110 will be written.

The majority of the MPE Distributor Editor Interface 260 is a field 264 for listing tracks to be processed. An unlimited number of tracks can be modified at once in a batch process.

The "Distributor" button and associated field 266 allows for the entry or adjustment of all contact details for the MPE Distributor Editor. Clicking on the "Distributor" button brings up a window with all the contact information for a particular distributor for easy modification.

The "Add" button adds one or more MPE files 110 to the list 264 to be processed, while the "Remove" button removes the currently selected MPE file 110 from the list of files to be processed.

Clicking on the "Encode" button begins the process of modifying the selected MPE files 110 and writing them into the Target directory 262.

Clicking on the "Cancel" button allows the Encoding process to be terminated after it has begun.

Features and Benefits

The system and method of the invention provides a wealth of features that benefit content owners, content distributors and consumers. Key to this are the Security, Accessibility, Superdistribution, and Branding Capability that the invention provides.

1. Security

Security in digital content represents the degree to which that content is protected from unauthorized use. The invention provides security in the form of encryption, using sophisticated algorithms to encrypt the media content such that it cannot be interpreted without the correct decryption key.

As well, the encryption algorithm is never exposed to the Consumer 130 or to the Content Owner 132. All generation of encryption or decryption keys is done by the MPE servers 134 and is never accessible to the public. The net result of this tightness of control over the encryption/decryption keys is dramatically increased security over any system which allows users to access multiple keys and potentially identify patterns within them.

MPE decryption keys reference multiple identifiers found on the consumer's hardware, some of which are unique. Any decryption key will therefore only work on one piece of hardware, so MPE files 110 can be shared or copied without allowing any additional users to have free access to the encrypted content of the MPE file 110. The Consumer 130 never comes into direct contact with a decryption key, as the issuance and installation of a decryption key is done automatically and transparently to the user. Keys are issued between the MPE player 140 and the MPE servers 134 without exposing them to the Consumer 130.

The decryption key of each song is itself encrypted with the individual Consumer's key before the MPE server 134 sends this decryption key (the "Song Key") to the user's player software 140. This encrypted Song Key can only be decrypted by the MPE playing software 140 (such as that built in to every MPE) running on that individual's hardware. This is done to prevent piracy through file copying and sharing and is totally transparent to the Consumer 130, making it a simple but powerful solution for security.

The Song Key is stored within a file on the Consumer's system 38 to allow the Consumer 130 to access the MPE file 110 while off-line. This Song Key is still encrypted with the user's key information while being stored. Although the system would be more secure if it required the user to be online to access their MPE content, this is not a practical solution, as the vast majority of Consumers 130 are online only part of the time. This file is encrypted yet again, for three levels of encryption (the song key, user key, and a third encryption on the key file).

These security features and their implementation differentiate the system of the invention from other music delivery systems in its robustness and invisibility from the Consumer's perspective. This transparent quality not only increases security, it further serves to enhance the user experience.

2. Accessibility

Accessibility, in the context of media formats, is a measure of the degree to which a given format is easily used. A highly accessible format should ideally have no barriers to entry and should be simple to understand. Accessibility is necessary in a DRM solution because most consumers will not find sufficient motivation to overcome any level of difficulty in using a software product for the first time. In order to encourage the general public to embrace a technology, accessibility is required.

The system and method of the invention provides a highly accessible solution by being a self-executing (.EXE) file. This means that simply double-clicking on an MPE file 110 on any Windows™ OS (Windows 95, 98, NT, 2000) platform will cause the file to open and play itself, regardless of what software the Consumer 130 may have installed on his computer 38. This dramatically increases accessibility over other solutions which require the Consumer 130 to have installed one or more software packages prior to being able to use the content. Any software installment requirement serves as a barrier to entry and reduces accessibility. The preferred system and method of the invention has no software installment requirements.

MPE files 110 is also playable on Macintosh™ computers (Mac). Although the Macintosh does not support Windows-compatible executables directly, the same MPE files 110 accessible on a Windows platform can also be accessed on the Mac. On the Mac, MPE files 110 require that a player (such as the Destiny Media Player) be installed prior to playing the MPE files 110. This does represent a lower level of accessibility than on a Windows platform, but preserves the accessibility of any MPE file 110 across Windows, Mac, and in future Linux, PalmOS, and other platforms without an unmanageable proliferation of formats. As many competing DRM solutions do not support the Macintosh at all, the system of the invention has a comparatively, very high level of accessibility on that platform.

Portable digital music playing devices are becoming a very popular way to access content in MP3 or other digital formats. The system of the invention can be easily supported on units designed to play MP3 files, as each MPE file 110 wraps up and may encrypt an MP3 file. In the case of players which have no way to save or copy content (such as Diamond Rio), a decrypted MP3 file can be generated by the MPE player software 140 and transferred to the portable player.

3. Superdistribution

Superdistribution is a quality determined by how "viral" a format is, or how easily it can spread itself from one system to another. Having a high degree of virality does not indicate any of the negative connotations associated with the term "virus"; it merely indicates virus-like behavior and ideally the ability to grow and spread from system to system exponentially.

The system of the invention is highly viral in that it can be shared between computers, delivering the same Consumer experience regardless of how many users have handled the file previously. When a Consumer 130 downloads or receives an MPE file 110 and goes through the purchase process, they are issued a User Key which is generated using references in their specific and unique hardware. The use of references on the Consumer's hardware is known in the art as "bonding". The User Key which results will not function on any other hardware. Therefore, when the Consumer 130 shares an MPE file 110 with others, the others will have to follow the process of the invention themselves to obtain access to the encrypted content.

MPE files 110 are very small in size, in most cases equal in size to a standard MP3 file plus 350 kilobytes. This typically represents an increase in size of 5 to 10 percent, adding less than two minutes of download time to a 28.8 modem user and only a few seconds to a broadband user. This means that the MPE files 110 are easily shared with others, whether through distributed computing or through e-mail. Since most e-mail services limit message size to 5 megabytes or less, this means that MPE files 110 of four and a half minutes or less would be e-mailable, which would include the majority of music content available today.

The superdistribution offered by the invention is extremely effective as each MPE file 110 continues to track the original distributor 136 even after it has passed through one or more consumers 130. Revenues continue to flow to all interested parties.

4. Branding capability

Branding capability represents the ability of a format to communicate an individual branding message for different Content Owners 132 using that format. A format with strong branding capability should be able to express the same or enhanced product packaging commonly associated with the content, allowing the Content Owners 132 to maintain strong and consistent image and product placement.

The invention has very strong branding capability in that it allows Content Owners 132 to present a unique full color 128×128 pixel bitmap image in each MPE files 110. Further, text is presented in Rich Text Format, allowing for layout, font and color variations throughout the text block. The background color of the text block can also be modified to further reinforce the branding.

Automatically determined and supported ID3 tags associated with each MPE files 110 further reinforce branding by allowing compatible players to associate the file clearly with the artist or within the genre appropriate to the content.

All these features are in stark contrast to MP3, the current download format of popular choice, which only provides non-automated ID3 tags and the filename itself for branding.

ALTERNATIVE EMBODIMENTS

The method and system of the invention is capable of wrapping and delivering any media type. MP3 has been used as an initial product positioning decision, and the product will be expanded to serve as a secure digital distribution system for other file types. For example:

1. MPE encryption and delivery can be used to distribute and sell printed materials such as books, reports, magazines and other text over the Internet. Analogous to the current audio MPE, text MPE files would provide a preview section (which may be the text which would normally be included on a book's jacket or in advertising literature), as well as graphics and e-commerce capabilities;
2. entire feature films, music videos, training programs and the like, could also be distributed over the Internet or similar communication network using the system and method of the invention. With film, the Preview section 124 could correlate to the preview trailer or an excerpt of the film. As with audio MPE, MPE for film would contain a rich media portion, providing graphics and text as well as e-commerce capabilities; and
3. the invention could also be used as a delivery system for software, vector graphic animations and electronic trading cards.

While particular embodiments of the present invention have been shown and described, it is clear that changes and modifications may be made to such embodiments without departing from the true scope and spirit of the invention.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory medium such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

The invention could, for example, be applied to computers, smart terminals, television set-top boxes, personal digital assistants, cellular telephones, and Internet-ready telephones. Again, such implementations would be clear to one skilled in the art, and do not take away from the invention.

What is claimed is:

1. A method of distributing electronic media, the method comprising:
    receiving a file at a user computing device, the file comprising an integral decryption engine and encrypted media content;
    requesting a decryption key from a remote server;
    receiving the decryption key from the remote server at the user computing device over a communication network, the decryption key itself encrypted at the remote server with a user key, the user key bonded to the user computing device by being based at least in part on one or more characteristics of the user computing device such that the user computing device can use the user key to decrypt the decryption key; and
    responding to receipt of said decryption key from said remote server at the user computing device by:
        using the user key to decrypt the decryption key at the user computing device;
        decrypting said media content at the user computing device using said integral decryption engine and the decryption key
    wherein receiving the file at the user computing device comprises receiving the file from a remote computer over the communication network that includes the remote server from which the decryption key is received but through a communication path that does not include the remote server from which the decryption key is received.

2. The method of claim 1, comprising, after decrypting the media content, viewing said media content by executing viewer software, the viewer software also integral with said file.

3. The method according to claim 2 wherein decrypting the media content and viewing the media content are accomplished without storing a decrypted copy of the media content in memory accessible to a user of the user computing device.

4. The method of claim 1, comprising, after decrypting the media content, viewing said media content by executing external viewer software linked to said file.

5. The method according to claim 1 comprising generating the user key at the user computing device.

6. The method according to claim 5 wherein decrypting the media content at the user computing device using the integral decryption engine and the decryption key comprises using the user key to decrypt the decryption key and to thereby obtain a decrypted decryption key.

7. The method according to claim 6 wherein the file is executable independently of other programs and wherein generating the user key, requesting the decryption key, using the user key to decrypt the decryption key and decrypting the media content are accomplished by executing the file.

8. The method according to claim 7 wherein the file also comprises integral media player software and wherein executing the file also causes execution of the integral media player software and playback of the media content.

9. The method according to claim 6 wherein using the user key to decrypt the decryption key is performed without storing the decrypted decryption key in memory accessible to a user of the user computing device.

10. The method according to claim 9 wherein decrypting the media content and viewing the media content are accomplished without storing a decrypted copy of the media content in memory accessible to a user of the user computing device.

11. The method according to claim 6 comprising previewing a previewable portion of the media content prior to decrypting the media content using the integral decryption engine and the decryption key.

12. The method according to claim 6 wherein receiving the file at the user computing device comprises downloading the file from the remote computer using a peer to peer network, the remote computer different from the remote server from which the decryption key is received.

13. The method according to claim 1 wherein receiving the file at the user computing device comprises downloading the file from the remote computer using a peer to peer network, the remote computer different from the remote server from which the decryption key is received.

14. The method according to claim 1 comprising previewing a previewable portion of the media content prior to decrypting the media content using the integral decryption engine and the decryption key.

15. The method according to claim 1 wherein decrypting the media content at the user computing device using the integral decryption engine and the decryption key comprises using the user key to decrypt the decryption key and to thereby obtain a decrypted decryption key.

16. The method according to claim 1 comprising:
    sending the file from the user computing device to a second user computing device over the communication network over a second communication path that does not include the remote server;
    upon receipt of the file at the second user computing device:
        sending a request, from the second user computing device to the remote server, for the decryption key;
        receiving the decryption key from the remote server at the second user computing device, the decryption key itself encrypted at the remote server with a second user key, the second user key bonded to the second user computing device by being based at least in part on one or more characteristics of the second user computing device such that the second user computing device can use the second user key to decrypt the decryption key; and
        responding to receipt of the decryption key from the remote server at the second user computing device by decrypting the media content at the second user computing device using the integral decryption engine and the decryption key.

17. The method according to claim 16 comprising, after receiving the file at the second user computing device, generating the second user key at the second user computing device.

18. The method according to claim 17 wherein decrypting the media content at the second user computing device using the integral decryption engine and the decryption key comprises using the second user key to decrypt the decryption key and to thereby obtain a decrypted decryption key.

19. The method according to claim 1 wherein the decryption key received at the user computing device is permanent such that decrypting the media content at the user computing device using the integral decryption engine and the decryption key may be performed multiple times at the user computing device using the integral decryption engine and the same decryption key.

20. The method according to claim 1 wherein the user key is based on a digital fingerprint of the user computing device.

21. A method of managing distribution of proprietary electronic media, the method comprising:
  receiving a single file at a user computing device, the single file comprising an integral decryption engine, encrypted media content and integral media playback software, the single file executable independently of other programs to:
    obtain a decryption key from a remote server over a communication network, the decryption key itself encrypted at the remote server with a user key, the user key bonded to the user computing device by being based at least in part on one or more characteristics of the user computing device such that the user computing device can use the user key to decrypt the decryption key;
    use the user key to decrypt the decryption key at the user computing device;
    decrypt the media content using the integral decryption engine and the decryption key; and
    view the media content using the integral media playback software
  wherein receiving the single file comprises downloading said single file from a computer via the communication network;
  wherein the communication network from which the single file is downloaded includes the remote server from which the decryption key is obtained; and
  wherein downloading the single file from the computer via the communication network comprises downloading the single file from the computer through a communication path that does not include the remote server from which the decryption key is obtained.

22. The method of claim 21, wherein said remote server tracks a number of decryption keys relating to the single file that have been issued by the remote server.

23. The method according to claim 21 wherein decrypting the media content and viewing the media content are accomplished without storing a decrypted copy of the media content in memory accessible to a user of the user computing device.

24. The method according to claim 21 wherein the single file is executable to view the media content using the integral media playback software without storing a decrypted copy of the media content in memory accessible to a user of the user computing device.

25. The method according to claim 21 wherein the remote server tracks a number of decryption keys relating to the single file that have been issued by the remote server.

26. The method according to claim 21 comprising previewing a previewable portion of the media content prior to decrypting the media content using the integral decryption engine and the decryption key.

27. The method according to claim 21, wherein execution of the single file causes the user computing device to generate the user key at the user computing device.

28. The method according to claim 27 wherein execution of the single file to decrypt the media content using the integral decryption engine and the decryption key comprises using the user key to decrypt the decryption key and to thereby obtain a decrypted decryption key.

29. The method according to claim 21 comprising:
  sending the file from the user computing device to a second user computing device over the communication network over a second communication path that does not include the remote server;
  upon receipt of the file at the second user computing device:
    sending a request, from the second user computing device to the remote server, for the decryption key;
    receiving the decryption key from the remote server at the second user computing device, the decryption key itself encrypted at the remote server with a second user key, the second user key bonded to the second user computing device by being based at least in part on one or more characteristics of the second user computing device such that the second user computing device can use the second user key to decrypt the decryption key; and
    responding to receipt of the decryption key from the remote server at the second user computing device by decrypting the media content at the second user computing device using the integral decryption engine and the decryption key.

30. The method according to claim 29 comprising, after receiving the single file at the second user computing device, generating the second user key at the second user computing device.

31. The method according to claim 30 wherein decrypting the media content at the second user computing device using the integral decryption engine and the decryption key comprises using the second user key to decrypt the decryption key and to thereby obtain a decrypted decryption key.

32. The method according to claim 21 wherein the decryption key obtained at the user computing device is permanent such that subsequent executions of the single file decrypt the media content at the user computing device using the integral decryption engine and the same decryption key.

33. The method according to claim 21 wherein the user key is based on a digital fingerprint of the user computing device.

34. A method of distributing electronic media, the method comprising:
  receiving a file at a user computing device, the file comprising an integral decryption engine and encrypted media content;
  generating a user key at the user computing device, the user key bonded to the user computing device by being based at least in part on one or more characteristics of the user computing device;
  requesting a decryption key from a remote server;
  receiving the decryption key from the remote server at the user computing device over a communication network, the decryption key itself encrypted at the remote server with the user key such that the user computing device can use the user key to decrypt the decryption key; and
  responding to receipt of said decryption key from said remote server at the user computing device by:
    using the user key to decrypt the decryption key and to thereby obtain a decrypted decryption key at the user computing device; and decrypting said media content at the user computing device using said integral decryption engine and the decrypted decryption key;
wherein receiving the file at the user computing device comprises receiving the file from a remote computer over the communication network that includes the remote server from which the decryption key is received but through a communication path that does not include the remote server from which the decryption key is received.

* * * * *